Sept. 9, 1924.　　　　　　　　　　　　　　　　　　　　1,507,958
T. HANSEN ET AL
RIVET HEADING MACHINE
Filed Oct. 14, 1921　　　　　4 Sheets-Sheet 2
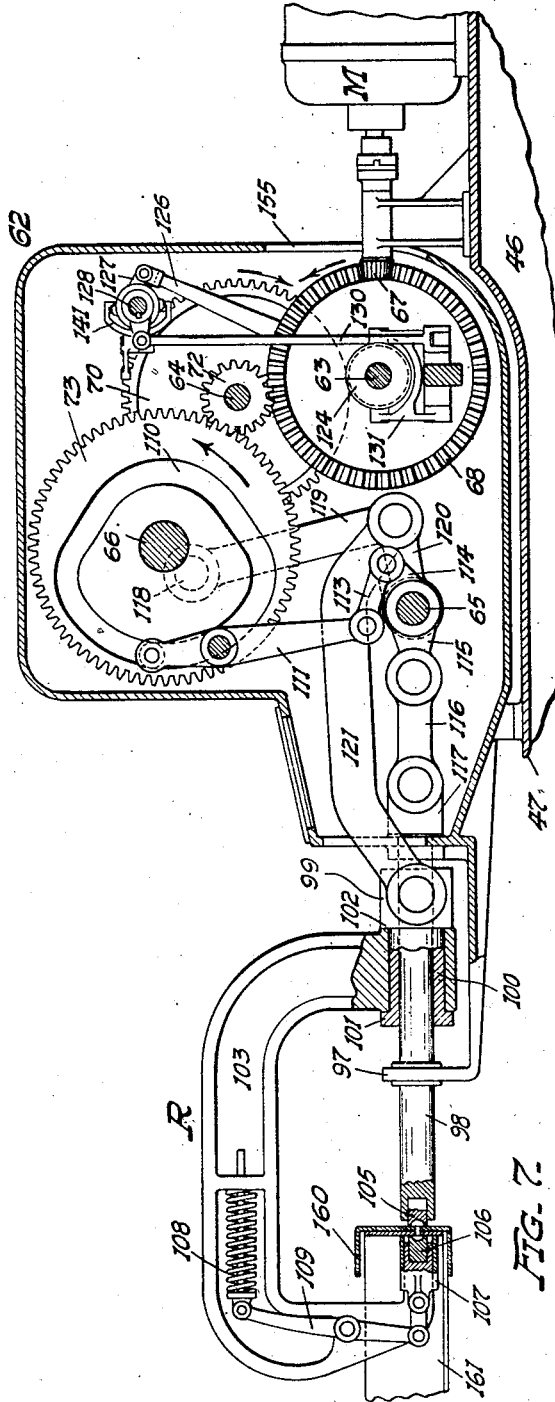
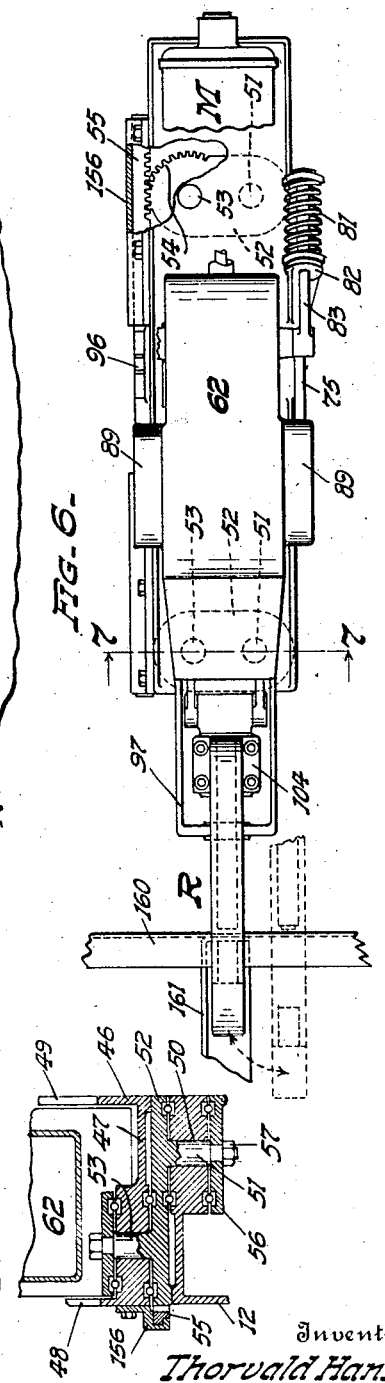
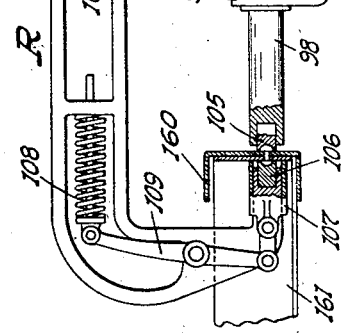
Witnesses:
Phil J. Nairn
Inventors:
Thorvald Hansen
and Reimar C. F. Kurtze.
By Crevin, Wheeler & Woolard
Attorneys.

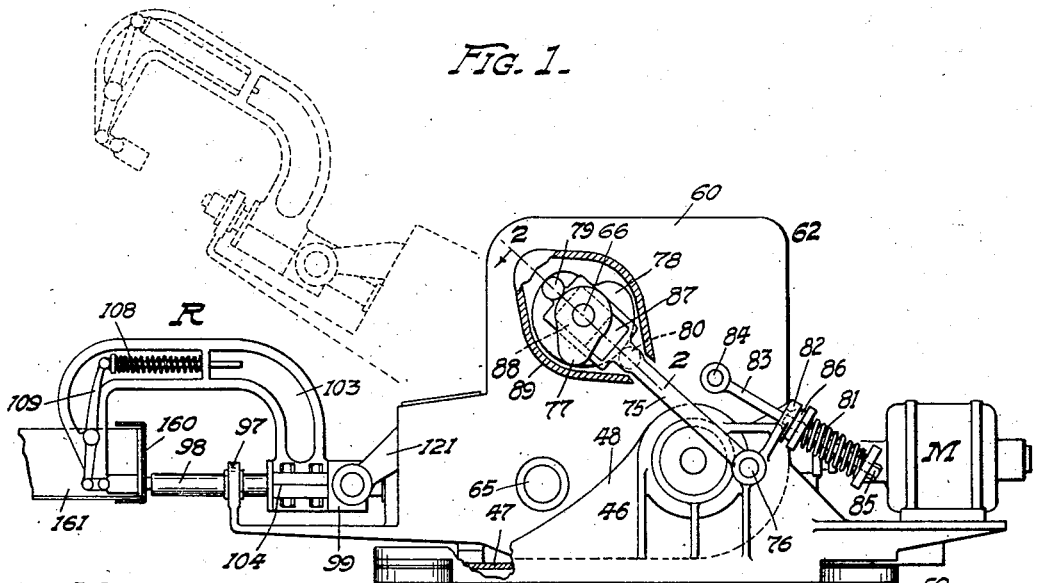

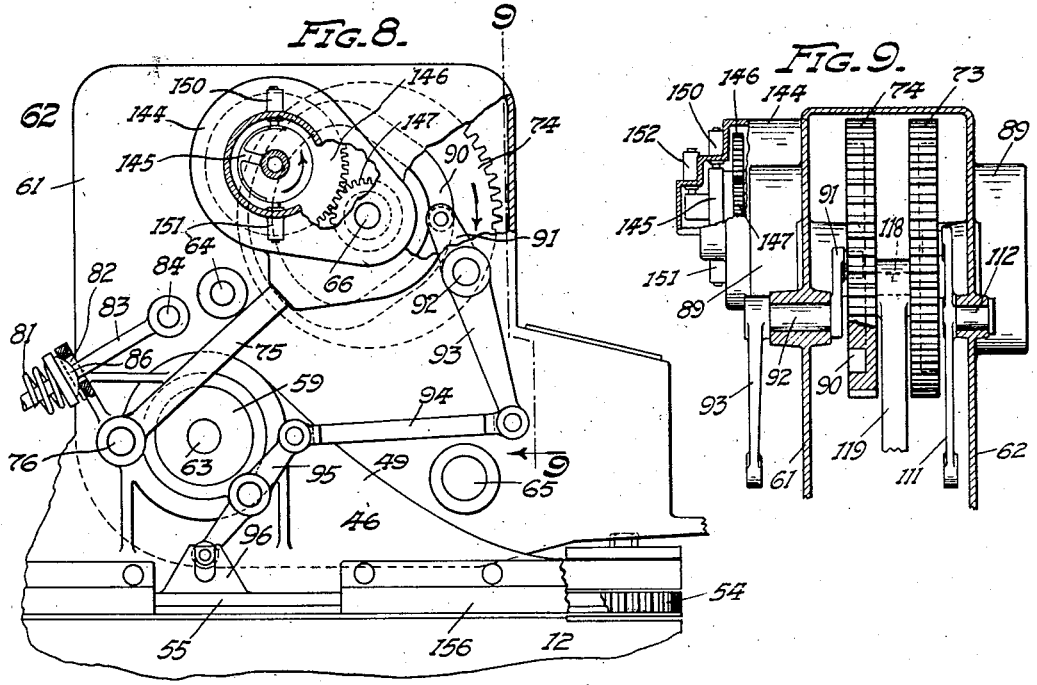
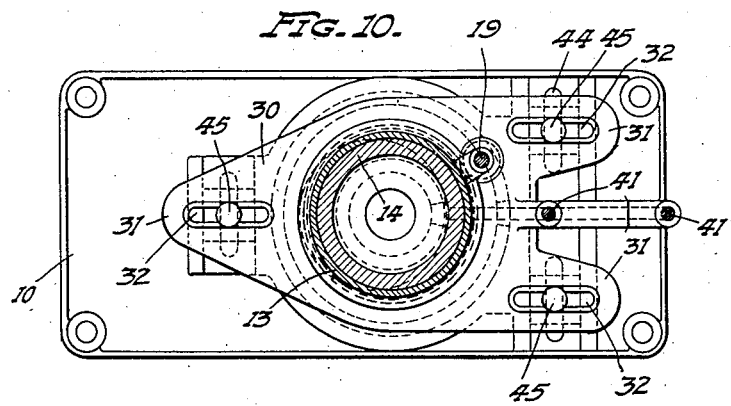
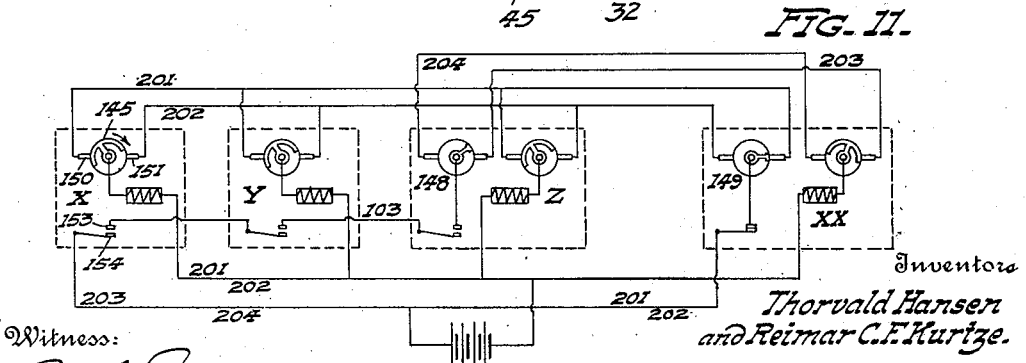

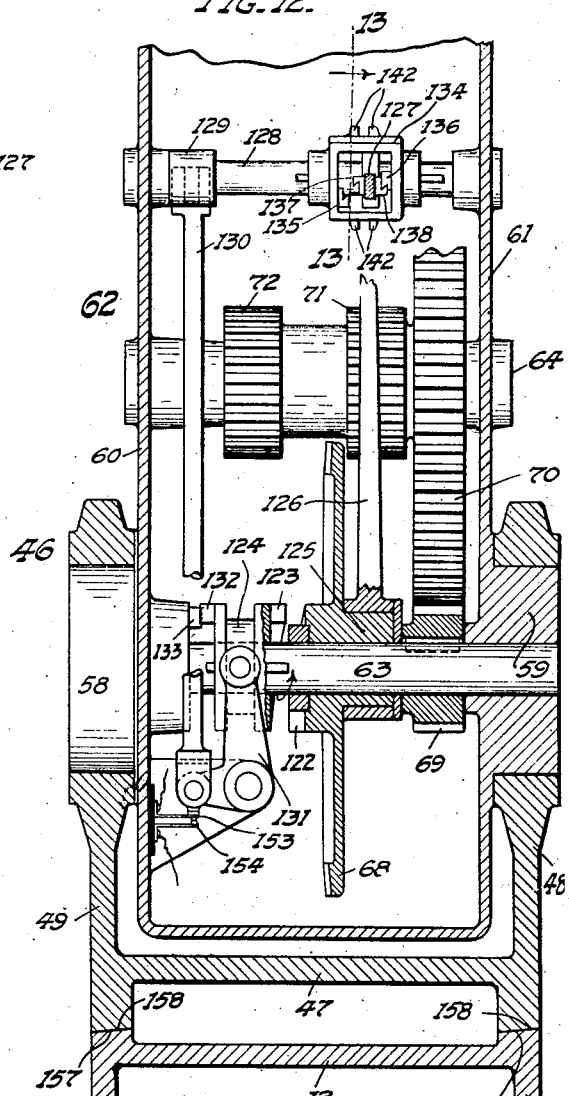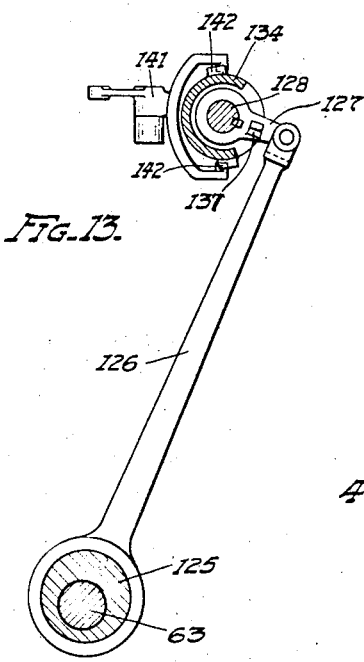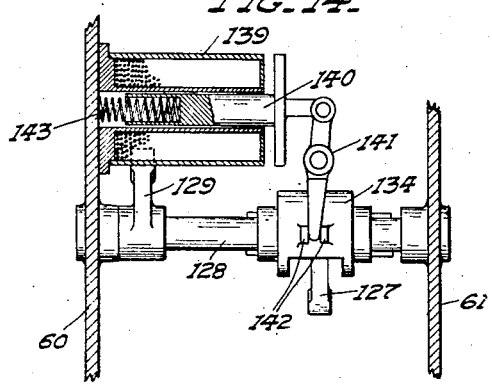

Patented Sept. 9, 1924.

1,507,958

UNITED STATES PATENT OFFICE.

THORVALD HANSEN AND REIMAR C. F. KURTZE, OF MILWAUKEE, WISCONSIN, ASSIGNORS TO A. O. SMITH CORPORATION, OF MILWAUKEE, WISCONSIN, A CORPORATION OF NEW YORK.

RIVET-HEADING MACHINE.

Application filed October 14, 1921. Serial No. 507,737.

*To all whom it may concern:*

Be it known that we, THORVALD HANSEN and REIMAR C. F. KURTZE, citizens of the United States, and residing in the city of Milwaukee, county of Milwaukee, and State of Wisconsin, have invented certain new and useful Improvements in Rivet-Heading Machines; and we do declare the following to be a clear, exact, and complete description thereof, such as will enable others skilled in the art to which the invention pertains to make and use the same, reference being had to the accompanying drawings as showing a construction in which our invention has been embodied.

This invention relates to machines for riveting together assembled sheet metal bars and other parts which enter into the construction of automobile and other vehicle frames. The invention comprises riveting mechanism adapted principally to the work of riveting together the flanged side and cross bars of such frames. The machine in the embodiment which we have chosen as an illustration, is constructed to operate upon rivets which extend horizontally in the assembled frame elements, when the latter are presented to the riveting mechanism, but its fundamental construction is applicable to machines for operating upon vertically placed rivets, as well as to machines for performing other and different operations.

Machines embodying the present invention are designed to form elements of the assemblage of machines disclosed in an application filed January 21, 1918, by R. Stanley Smith, Serial No. 212,934, and on which Patent No. 1,397,020 was granted November 15, 1921, such assemblage including machines which by their sub-divided but related and connected successive operations, punch from metal plates and strips the side and cross bars and other blanks used in constructing an automobile or other vehicle frame, shape such blanks according to the particular requirements appertaining to each, perform the necessary milling and finishing operations thereon, assemble the several constituent parts, and secure all of such parts in their respective positions, by means of rivets, so that in a continuous operation of mechanical devices a completed automobile or other vehicle frame of unitary and rigid structure is automatically produced.

In the assemblage described in the patent above referred to, a plurality of riveting machines embodying the principles of our invention and operating in the manner disclosed, will be employed at each riveting station. The number and position of such machines will be determined by the number of rivets to be set in uniting the side bars and cross bars and in attaching other parts to the automobile frame, and by the relative location of such rivets. The tables of each of the riveting machines will be adjusted to the desired vertical and lateral positions to bring the riveting mechanism into line with the rivets, when the parts to be riveted together to form a frame have been assembled and positioned for the action thereon of the riveting mechanism.

Inasmuch as precise location of the riveting mechanism with relation to the work conveyor shown and described in the patent referred to, and by means of which the assembled frame elements are presented to the riveting machines, is necessary to the attainment of satisfactory results in the operation of the present invention, we have devised means for securing an accurate vertical and lateral or radial adjustment of the table, through its supporting pedestal, to bring the riveting mechanism into correct position with relation to the rivets to be operated upon.

Our invention comprises movable riveting mechanism, which at the desired times will be carried into and out of the plane or fixed path of movement of the work, to permit movement of the latter, so that rivets which have been automatically placed with reference to the assembled parts which they are to unite, will be upset or spread and such parts will thus be firmly secured together into a rigid and unitary form structure.

In such riveting operation, the riveting mechanism may have a rocking movement into the path of travel of the work conveyor, after the assembled frame parts carried thereby and to be riveted are brought into riveting position, and such further movements as may be necessary to bring the riveting elements into the angle formed by such parts and in proper position to upset or spread the rivets. At such time the separated dies of the riveting mechanism will be positioned on opposite sides of the frame member, one die being adjacent the head of the rivet and the other die in line with the point.

We have also devised novel actuating means for so moving the riveting mechanism into operating position with relation to the assembled frame elements, and for actuating such mechanism when properly positioned, to perform the riveting operations.

The appended claims will point out these as well as other novel features residing in our invention.

In the drawings which accompany this specification,

Figure 1 is a view in side elevation showing our riveting machine, with certain details of construction shown in section.

Fig. 2 is a sectional view on the line 2—2, Fig. 1, of the cams for positioning the riveting head and withdrawing the head after each operation.

Fig. 3 is a view showing the action of the riveting head in spreading a rivet to unite a cross bar to a side bar of an automobile frame.

Fig. 4 is an end view of the riveting head in its operating position, the view being taken on the line 4—4, Fig. 3.

Fig. 5 is an enlarged longitudinal sectional view through the pivoted housing, and showing the arrangement within the housing of the cams and toggles which impart movement to the riveting elements, and illustrating somewhat more clearly the action of the riveting mechanism.

Fig. 6 is a plan view, partly in section, of the housing for the cams and toggles, with the riveting head as positioned for a riveting operation, this view also showing the riveting head by dotted lines as in its inoperative and retracted position, which it assumes before and after each riveting operation.

Fig. 7 is a sectional view on the line 7—7, Fig. 6, showing the manner of mounting the housing on the table of the machine, so as to provide for the lateral movement of the riveting head which is supported in the housing.

Fig. 8 is a view in elevation, the opposite of Fig. 1. but broken away in part, showing the cam and lever arrangement for actuating the rack to impart lateral movement to the riveting head, and showing also the commutator for controlling the driving clutch, by means of which the mechanism is rendered operative at the desired time.

Fig. 9 is a view partly in section, on the line 9—9, Fig. 8.

Fig. 10 is a horizontal sectional view through the pedestal on the line 10—10, Fig. 1, and showing the base in plan.

Fig. 11 is a diagram showing the electrical circuits of a riveting station comprising three riveting machines, and also the wiring for the conveyor by means of which the frame is carried past the riveting station.

Fig. 12 is an enlarged vertical sectional view through the housing, looking from the right in Fig. 5, and showing some of the parts in section and others in elevation.

Fig. 13 is a detail view showing in elevation the actuator for the driving clutch, with certain parts shown in section.

Fig. 14 is a plan view partly in section, looking from the top of Figs. 5 and 12, of the solenoid and the devices actuated thereby to render effective the actuator for the driving clutch.

The machine comprises a base 10, which may be secured to the floor, a pedestal 11, connected to the base, and a table 12, attached to the pedestal. The riveting head R and its operating mechanism are mounted upon and carried by the table 12.

The pedestal 11 is formed of two hollow cylinders, 13 and 14, the outer and upper cylinder 13 being attached to the table and the inner and lower cylinder 14 being adjustably positioned upon the base. The two cylinders 13 and 14 forming the pedestal, are constructed for axial movement, one within the other, whereby there exists capacity for vertical adjustment of the table with relation to the base. The outer cylinder 13, is free to slide over the inner cylinder 14, so that the desired elevation of the riveting head R carried by the table may be secured. The said inner cylinder 14 is screw-threaded on its exterior surface, as at 15. An internally screw-threaded ring 16 is placed about and engages the threads 15 of the cylinder 14. The ring 16 is provided with gear teeth 17 upon its periphery, and with the gear teeth 17 is engaged a pinion 18, upon the lower end of a vertical shaft 19, journalled in lugs 20 upon the outer cylinder 13. A bracket 21 extending from the cylinder 13 carries a short shaft 22, to the outer end of which a hand wheel 23 is secured. Through bevel pinions 24, connecting the shafts 19 and 22, motion is transmitted from the hand wheel to the pinion 18. The rotation of the screw-threaded ring 16 about the threaded cylinder 14, acts to raise or lower the table C, and thus the desired vertical adjustment of the latter with the riveting head R is attained. The outer cylinder 13 is split at 25 for a part of its length, and adjacent the split is provided with lugs 26, which receive a bolt 27. By tightening the bolt and drawing the lugs toward each other, thus clamping the cylinder 13 upon the cylinder 14, the adjusted vertical position of the table 12 is secured and preserved against accidental disturbance.

In the base 10 is formed an opening 28, into which opening is fitted the reduced lower end 29, of the cylinder 14. The said lower end of the cylinder 14 is provided with a laterally extending plate or flange 30, by means of which the attachment in adjusted position of the pedestal 11 to the base 10 of the machine may be effected. We have shown the plate or flange 30, Fig. 10, as provided with extensions 31, in which vertical slots 32 are formed therethrough, and which slots are disposed in parallel planes. The opening 28, in the base is enlarged at the upper side to form a recess in which are placed two eccentrics 33, 34, one working within the other, the inner eccentric 33 being journalled on the reduced lower end 29 of the cylinder 14, and each eccentric is provided with gear teeth 35, 36, on the face thereof. Mounted in the base 10, and also in the plate 30, are short shafts 37, carrying at one end bevel pinions 38, which mesh with the gear teeth 35, 36, of the respective eccentrics 33, 34, and at their other ends bevel pinions 39. Standards 40, 40' attached to the base 10 and to the plate 30, support shafts 41, 41', having at one end bevel pinions 42, 42', engaging with the pinions 39, 39', and to the other ends of the shafts are affixed hand wheels 43, 43': By turning these hand wheels the eccentrics 33, 34, are rotated through the connections described, the lateral or radial adjustment of the pedestal and table within the limits of the compound throw of the eccentrics is effected, and the riveting head is brought to the exact position with relation to the assembled frame elements necessary for the successful operation of the riveting machine.

The base 10 is slotted as at 44, such slots standing in planes transverse to the slots 32 in the plate 30. Bolts 45 are passed through the slots in the base 10 and plate 30, and by tightening the said bolts, the adjusted lateral or radial position of the riveting head is secured. Although a compound eccentric motion is shown, it will be understood that a single eccentric operating as described, may be used, to effect the adjustments desired.

Mounted upon the table 12, in the manner hereinafter described, is a carrying frame 46, for the riveting head and its operating mechanism. This carrying frame is composed of a base 47, and two upstanding side plates 48 and 49. The mounting of the frame 46 upon the table must be such as to permit the riveting head R to have a bodily movement into operative relation to the work, upon the latter being positioned, and to permit the retraction of the riveting head upon completion of the riveting operation. In the table 12, at each end thereof, is formed a bearing 50, for a depending post 51, set concentrically with relation to one arcuate end of a plate 52, and about which post the plate oscillates as a center. At the other arcuate end of the plate 52, and upon the upper side thereof, is another post 53, likewise set concentrically with relation to such other end of the plate. The arcuate portion of the edge of each plate 52, adjacent the upstanding post 53, is toothed as at 54; see Fig. 6. A toothed rack 55 engages the toothed sections of the two plates 52, and imparts oscillatory motion to the said plates, in the manner hereinafter described. Ball bearings encircle the posts 51, and ease the rotary reciprocations of the plates 52, on the table 12. A wear plate 56, is set upon the lower end of the posts, and a nut 57, is threaded on the end of the latter, ball bearings, as before, being disposed between these parts.

The side plates 48 and 49, of the carrying frame 46, have enlarged openings 58 for the bushings 59, attached to the side walls 60, 61, of the housing 62, and on which bushings the said housing rocks in its oscillating movements to bring the riveting devices into and out of position in the plane of the work, one of such openings and bushings being shown in Fig. 12. A transverse shaft 63, journalled centrally in the said bushings, is the axis about which the housing 62 oscillates. Other transverse shafts 64, 65, and 66, are journalled in the side walls 60, 61, of the housing 62.

The rear end of the housing 62 is slotted at 155, so as to permit the rocking movement of the said casing about the shaft 63 without interference with the motor shaft, the adjacent corner of the housing being rounded, as shown in Fig. 5, so as to permit clearance of the carrying frame 46 in such rocking movement.

The upstanding posts 53 hereinbefore referred to, act as journals for the carrying frame 46, the said posts being received in openings formed in the base 47, of the carrying frame. Ball bearings like those described in connection with the arrangement of the posts 51, are provided for the posts 53, as shown in Fig. 7. The rack 55 which actuates the plates 52, is maintained in operative engagement with the toothed segmental ends of the said plates 52, by means of a guide 156, attached longitudinally of the side plate 48 of the carrying frame 46. Reciprocation of the rack 55, as hereinbefore described will rotate the plates 52 about the depending posts 51, with the result that a swinging movement will be imparted to the riveting head into and out of the dotted line position indicated in Fig. 6. To facilitate the swinging movement of the riveting head, the frame 12 is provided at the top thereof with bearing surfaces 157, which are inclined with respect to the direction of the swinging movement described. The carrying frame 46 is provided with co-active inclined bearing surfaces 158. This arrangement of inclined supporting and bearing surfaces obviates the friction which would occur in the swinging movement were the said surfaces horizontally arranged.

A motor M, attached to the rear of the carrying frame 46 is coupled by a short driving shaft to the pinion 67, engaging a bevel gear 68, which latter is loose upon the shaft 63. Fast upon the shaft 63, is a gear 69, which engages with a gear 70, fixed upon the shaft 64. Other gears 71 and 72, fixed upon the said shaft 64, mesh with gears 73 and 74, fast upon the shaft 66. The several cams which operate the riveting mechanism are mounted upon the said shaft 66.

A link 75 is attached at one end to a stud 76, set in the plate 46, Fig. 1. At its free end, this link is widened and provided with an elongated opening, Fig. 1 through which passes the shaft 66. The said shaft carries cams 77 and 78 separated by the link 75, and co-acting with anti-friction rollers 79, 80, on opposite sides of the link and aligned with the perspective cams. In their rotation, the cams 77 and 78, through the link 75, which as before stated, is anchored at one end, will rock the housing 62 on its axis, the shaft 63, and so move the riveting head into and out of operative position in a vertical plane. A counterbalancing expansion spring 81 for the housing 62 and riveting head is provided. On the plate 46, is an ear 82, provided with an enlarged opening, through which passes the rod 83, attached at one end to a stud 84, on the said plate. The counter-balancing spring referred to is confined about the said rod between the said ear and an adjusting nut 85, on the threaded end of the rod, the opposite ends of the spring bearing against interposed washers. A spherical washer 86, is passed over the rod 83, and is seated in a correspondingly formed recess in the ear 82, so that the said rod may oscillate in a vertical plane as it moves through the enlarged opening in the ear. The said opening in the free end of the link 75, is indicated 87, in Figs. 1 and 2, and in the opening is a slide block 88, mounted upon the shaft 66, which block guides the end of the link 75 and serves to hold the rollers 79, 80, in true relation to their actuating cams. The end of the shaft 66 extends into a bay 89, formed on the side of the housing 62, in which bay the said cams are placed. The cam mechanism and spring compensation described are duplicated at the other side of the housing 62.

The gear 74, is provided with a cam groove 90, in which runs an anti-friction roll mounted upon the free end of a short arm 91, fixed upon one end of a short rock shaft 92, journalled in a boss in the side wall 61. A lever arm 93, is attached to the other end of the said shaft, and is connected at its free end by a link 94, to one end of a lever 95, centrally pivoted upon the said plate 49 of the frame 46. A roller pin at the other end of the lever 95, takes into the open notch of a lug 96, fixed to the toothed rack 55, whereby the plates 52 are oscillated by the engagement of the rack with the arcuate toothed portions of the said plates, so as to move the frame 46, with the housing 62 and the riveting head R mounted thereon, in a lateral or horizontal direction into and out of operative relation to the work. The gear 74 makes one revolution for each operation of the riveting mechanism.

The housing 62 is provided with extended bearings 97, forming guides for the plunger or hammer 98, of the riveting mechanism. A block 99 is bored to receive the shaft of the plunger or hammer, on which shaft the said block slides freely. For a part of its length, this block is reduced to form a sleeve 100 with shoulders 101, 102. The yoke 103 of the riveting head has a separable bearing 104, by means of which it may be attached to the sleeve of the block 99 between the shoulders thereof, and secured in the desired adjusted angular position thereon by means of clamping bolts uniting the two parts of the separable bearing, so as to permit the anvil to enter the recess at the junction of the side and cross bars.

A riveting die 105, is set in the end of the plunger 98, and the co-operating riveting die 106, constituting the anvil, is set in the opposing inturned end of the yoke 103, as shown in Fig. 5. A spring-pressed clamping sleeve 107, encircles the die 106, and stands normally in advance of the face thereof. Expansion springs 108, act through pivoted levers 109, to advance the sleeve, and when the riveting head has been positioned for its work, to clamp the lap of the cross bar against the side bar of the automobile frame, for instance, or other parts, it being understood that the assembled frame parts are held in a relatively stationary position for the performance of the riveting operation, as disclosed in the patent hereinbefore referred to. The springs will be compressed and the sleeve will recede as the anvil 106 approaches the work.

The gear 73 is provided with a cam groove 110, in which runs an anti-friction roll upon one end of a lever 111, pivoted intermediately upon a stud 112, journalled in a boss in the side wall 62 of the housing. A link 113, connects the other end of the said lever 111, with the arm 114 of a lever centrally pivoted on the fixed shaft 65. The other arm 115 of the centrally pivoted lever is connected by a link 116, to a head 117, fixed to the end of the plunger 98. The said lever arm 115 and link 116, act as a toggle to impart longitudinal reciprocation to the plunger and the die 105, when actuated through the connections described by the cam formed in gear 73, to upset or spread the point of the rivet and unite the frame elements. As in the case of gear 74, the gear 73 makes one revolution for each operation of the riveting mechanism.

Between the gears 73 and 74, the shaft 66 is divided and a crank pin 118, connects the said gears. The said crank pin actuates a pitman 119, connected at its other end to a link 120, pivoting on the fixed shaft 65. Links 121 connect the pitman 119 and the link 120 at their pivotal point, to the block 99, sliding on the plunger 98. The links 120 and 121, act as a toggle to impart longitudinal reciprocation to the yoke 103, and die 105, when actuated by the crank 118, to position the anvil 106, in the channel of the side bar and against the head of the rivet, to resist the pressure exerted by the plunger in the upsetting operation just described.

Referring to Fig. 12, one face of the hub of the gear 68 is formed with a clutch face 122, which is subject to engagement by the clutch face 123 of a clutch 124, the latter being splined upon the shaft 63, so as to rotate therewith. The other face of the hub of gear 68 is formed as an eccentric 125, which reciprocates the link 126, the other end of which link is connected to a radial arm or vibrator 127, which is free to oscillate about a rock shaft 128, journaled in the side walls of the housing 62. An oppositely extending arm 129, is fixed upon the rock shaft 128, and a link 130 extends between the said arm 129 and one arm of a bell crank lever 131, the yoke of which engages and operates the clutch hub 124.

The opposite face of the clutch hub 124, is provided with a projection 132, for engagement with a stop 133, formed on a boss on the side wall 60 of the housing 62.

A cylindrical casing 134, having a radial opening therein, is splined upon the shaft 128, so as to oscillate therewith, and yet be free to have longitudinal movement thereon. This casing receives in the said opening, the vibrator 127, and the sides of the opening within the casing are provided with projections 135 and 136, designed for engagement at predetermined times with similar projections 137 and 138, on opposite sides of the said vibrator 127, such engagement being dependent upon the direction of axial movement of the casing 134 with relation to the shaft 128.

A solenoid 139, Fig. 14, is mounted in the housing 62. The core 140 of the solenoid is connected to one arm of a centrally pivoted lever 141, the other arm of which is forked to embrace the cylindrical casing 134, spaced projections 142, on the said cylindrical casing, receiving between them the ends of the forked lever 141. An expansion spring 143, moves the core of the solenoid in opposition to its magnetic movement, when the solenoid is de-energized.

A small casing 144, attached to the side wall 61 of the housing 62, encloses a rotary timing switch 145, which latter is connected to a gear 146, rotating about a stud in the wall of the housing. A gear 147, keyed to the shaft 66, engages and drives the gear 146 and the timing switch, one revolution for each two revolutions of the said shaft, which as hereinbefore indicated, makes one revolution for each operation of the riveting mechanism. Fig. 11 indicates the wiring of a station comprising three riveting machines, X, Y, Z, the machines being wired in parallel, and adjusted to operate synchronously but alternately with the conveyor jig which latter is indicated XX, at the right in the said Fig. 11. One of the riveting machines of the group at the station, in the present instance, the machine Z, will be provided with a master switch, mounted upon the shaft of and operating synchronously with the timing switch of the said machine, the purpose of this master switch being to control the movements of the conveyor jig through the timing switch of the latter. The conveyor jig is moved intermittingly with the machines at the riveting station to convey the work step-by-step from one machine to the next, until all of such machines at the station which have been set for work, have performed their allotted operations, as disclosed in the patent hereinbefore referred to. The timing switch and the master switch 149 of the conveyor jig, are mounted upon a single shaft and operate synchronously.

Brushes 150 and 151, bear upon the sector of the timing switch 145, and a brush 152, bears upon the hub thereof. The riveting machines are now in operation, and the current flows through circuit 201. The rotary timing switch 145, moving in the direction indicated by the arrow, is shown as approaching the end of its contact with the brush 150. Upon breaking the circuit 201 at this point, the solenoid 139, is de-magnetized, and the spring 143 is freed for expansion to move the casing 134 to the left along the shaft 128, to bring the projection 136 into the path of movement of the projection 138 on the vibrator, in the upward movement of the latter. The shaft 128, is rocked in the said movement of the vibrator, and the clutch faces 122 and 123, are disengaged by the movement of the clutch member 124, through the arm 129, link 130, and bell-crank 131. The vibrator 127, continues to operate, however, through the movement of the eccentric 125, but the parts will remain at rest until after the solenoid has been again energized to move the casing 134 to the right, and the projection 135, thereon into the path of the projection 137 in the downward movement of the vibrator.

Normally separated contact points 153 and 154, attached to but insulated from the side wall 60 of the housing 62, are arranged to be brought together by the described movement of the bell crank 131, to close the break in circuit 203, provided each of the riveting machines has completed its operation. These contact points constitute a safety device, which prevents the premature starting of the riveting machines, should there be any failure upon the part of one of them to effect an operation.

Upon the completion of the riveting operation, the timing switch 145, passes from contact with the brush 150, in circuit 201, thereby breaking such circuit, as hereinbefore described, and comes to a position of rest in contact with brush 151, of circuit 202. This latter circuit, however, is broken at the point of the contact with the master switch of the conveyor jig, and will remain open until after the master switch has moved 180°.

Meanwhile, the master switch of the riveting station has closed the break in circuit 203, and the conveyor jig will be moved to position the parts to be riveted. At the conclusion of the conveying movement, the timing switch of the conveyor jig will break circuit 203, and establish circuit 204. At the same time, the master switch of the conveyor will close the break in circuit 202, the solenoids will be energized, and the riveting mechanism be again brought into operation, through the devices described. As the timing switch 145, passes the brush 151, circuit 202 will be broken, and the riveting machines will come to a position of rest, with circuit 201 again established. The master switch of the riveting station will close circuit 204 at the same time, and the conveyor jig will be again moved. At the termination of the movement of the latter, circuit 201 will be closed by the master switch of the conveyor jig, and the cycle of operations commenced anew.

The side bar is indicated 160 and the cross bar 161, these elements constituting parts of an assembled automobile frame, presented and supported in a definite relation to the riveting mechanism, by means of the conveyor mechanism disclosed in the said prior patent.

Having thus described our invention, what we claim and desire to secure by Letters Patent of the United States, is:—

1. In a riveting press, a movable riveting head provided with a set of riveting dies, in combination with automatically operating means for moving the head to position the dies in operative relation to the work, and means for actuating the dies when so positioned to perform a riveting operation upon the work.

2. In a riveting press, a pivoted riveting head provided with a set of riveting dies, in combination with means for rocking the riveting head in a vertical plane to position the dies with respect to the work, and means for causing the riveting dies when so positioned to approach each other to perform a riveting operation.

3. In a riveting press, a base, a riveting head movable on the base and provided with a set of riveting dies standing normally out of the plane of movement of the work, in combination with automatically operating means for moving the riveting head to operatively position the dies thereof with relation to the work, and means to actuate the dies when so positioned to perform a riveting operation.

4. In a riveting press, a riveting head comprising a yoke supporting oppositely arranged riveting dies, in combination with automatically operating means for moving the yoke to position the respective dies at opposite sides of the work, and means for causing the dies to approach each other when so positioned to effect a riveting operation.

5. In a riveting press, a riveting head comprising a yoke provided with oppositely arranged riveting dies, a plunger carrying one of the dies, and means upon the said yoke to permit angular adjustment of the yoke upon the plunger to enable the riveting dies to operate upon a rivet located in a recess in the work, in combination with means for moving the said yoke to operatively position the dies with respect to the work, and actuating means for effecting a riveting operation when the dies are so positioned.

6. In a riveting press for uniting a cross bar to the side bar of an automobile or other frame, a riveting head comprising a yoke provided with an anvil and a hammer opposing each other, and a member co-acting with the anvil to exert a yielding pressure at the point of union of the bars, in combination with means for moving the yoke to position the dies on opposite sides of the work, and means for actuating the hammer to perform a riveting operation.

7. In a riveting press, a riveting head comprising a yoke provided with co-operating riveting dies oppositely arranged at the ends thereof, in combination with means for moving the yoke to bring the dies into the plane of the work, means for effecting further movement of the yoke to position the dies with relation to the rivet, and means for actuating the dies when so positioned to perform a riveting operation.

8. In a riveting press, a riveting head provided with an anvil and a co-operating hammer, in combination with automatically operating means to move the riveting head into the plane of the work, means for engaging the anvil with the work when the riveting head is so moved, and means for actuating the hammer to perform a riveting operation.

9. In a riveting press, a support, a riveting head provided with dies, the riveting head being mounted upon the said support for movement of the dies into the plane of the work, and for further movement to position the dies with relation to the work, in combination with means for imparting the respective movements to the riveting head, and means for effecting a riveting operation when the dies are so positioned.

10. In a riveting press, a riveting head provided with an anvil and a hammer arranged on opposite sides of the plane of the work, toggle mechanism for moving the anvil into engagement with the work, and toggle mechanism for actuating the hammer to perform a riveting operation.

11. In a riveting press, a riveting head comprising a yoke provided with an anvil and a hammer, with means to move the yoke to position the anvil and hammer at opposite sides of the work, in combination with means to engage the anvil with the work, and means to actuate the hammer to perform a riveting operation, both said last mentioned means being located at one end of the yoke.

12. In a riveting press, a pivoted riveting head comprising a yoke provided with dies standing normally out of the plane of the work, means for rocking the riveting head to position the dies with relation to the work, and mechanism located in the line of the yoke and its pivotal point for actuating the dies to effect a riveting operation.

13. In a riveting press, a riveting head supporting an anvil and a hammer spaced apart, means for moving the riveting head to position the anvil and hammer at opposite sides of the work, means for moving the riveting head to engage the anvil with the work, and means to actuate the hammer to perform a riveting operation.

14. In a riveting press, a movable riveting head comprising a yoke supporting an anvil and a hammer spaced apart, means for rocking the riveting head to position the anvil and hammer at opposite sides of the work, and means for actuating the hammer to effect a riveting operation, when the riveting elements are thus positioned.

15. In a riveting press, a riveting head provided with riveting dies, a support for the head, and pivotal connections between the support and the riveting head, whereby the latter may be moved into the horizontal plane of the work to position the dies for a riveting operation, means for automatically moving the head, and actuating means for the dies to effect a riveting operation upon the work.

16. In a riveting press, a movable riveting head provided with riveting dies standing normally out of the plane of the work, means for moving the riveting head into the plane of the work to position the riveting dies with relation thereto, in combination with a fixed driving motor, operative connections between the said fixed motor and the said moving means, and means for effecting a riveting operation when the dies are positioned therefor.

17. In a riveting press, a riveting head provided with co-operating riveting dies standing normally out of the plane of the work, means comprising driven cams for moving the riveting head into operative relation with the work, means for effecting a riveting operation when the dies are thus positioned, and a counter-balance co-acting with the cams to restore the riveting head to its normally inactive position.

18. In a riveting press, a riveting head comprising a yoke carrying a movable anvil and a hammer, automatically operative means for moving the anvil into position at one side of the work and holding it in engagement with the work and against the pressure of the hammer during the riveting operation, and means for actuating the hammer to perform the riveting operation.

19. In a riveting press, a riveting head comprising a yoke supporting an anvil, a plunger upon which the yoke is guided, means to move the yoke on the plunger to engage the anvil with the work, and means to move the plunger to effect a riveting operation, the yoke moving means acting to resist the thrust of the plunger, whereby the point of the rivet is spread.

20. In a riveting press, a pivotally mounted riveting head and a support for the pivot thereof, in combination with cam-actuated connections between the pivotal support and the riveting head, whereby the riveting head is moved into operative position with relation to the work, and means for effecting a riveting operation when the riveting head is thus positioned.

21. In a riveting press, a movable riveting head provided with an anvil and a hammer adapted to be positioned on opposite sides of the work, automatically operating means for moving the anvil into engagement with the head of the rivet, and like operating means for moving the hammer into engagement with the point of the rivet to effect a riveting operation.

22. In a riveting press, conveyor mechanism for the work, and a riveting head carrying an anvil and a hammer standing normally aside from the line of movement of the work, in combination with means for moving the riveting head into operative position with relation to the work to perform a riveting operation.

23. In a riveting press, conveyor mechanism for the work, a riveting mechanism embracing an anvil and a hammer standing normally out of the line of movement of the work, in combination with means for moving the riveting mechanism into position with relation to the work, and means for actuating the riveting mechanism to perform a riveting operation.

24. In a riveting press, conveyor mechanism for the work, a riveting mechanism standing normally out of the line of movement of the work, in combination with means for moving the riveting mechanism into position with relation to the work, and means for actuating the riveting mechanism to perform a riveting operation.

25. In a riveting press, conveyor mechanism for the work, a movable riveting head normally positioned away from the line of movement of the work, riveting dies movable in the head, means for moving the riveting head up to the work to position the dies in relation thereto, and means for actuating the dies to perform a riveting operation when so positioned.

26. In a riveting press, a work conveyor movable in a fixed path, and riveting devices normally positioned away from such path, in combination with means for moving the riveting devices to position the latter with respect to the work, and means for actuating the said devices to perform a riveting operation.

27. A riveting press provided with a fixed path along which the work is moved, and a riveting head normally standing away from such path to permit movement of the work, in combination with means for moving the riveting head to position the dies thereof in relation to the work, and means for effecting a riveting action through the operation of the said dies.

28. In a riveting press, a riveting head provided with a set of riveting dies, and automatically operated means for moving such head to a definite position with relation to the work, in combination with means for actuating the said dies to perform a riveting operation while so positioned.

In testimony whereof, we have signed our names at Milwaukee, this 10th day of October, 1921.

THORV. HANSEN.
REIMAR C. F. KURTZE.

Witnesses:
W. F. WOOLARD,
E. W. BURGESS.